United States Patent [19]

Tassen

[11] 4,172,739

[45] Oct. 30, 1979

[54] SUN TRACKER WITH DUAL AXIS SUPPORT FOR DIURNAL MOVEMENT AND SEASONAL ADJUSTMENT

[75] Inventor: Devon Tassen, Millville, Calif.

[73] Assignee: Solar Homes, Inc., Berkeley, Calif.

[21] Appl. No.: 864,756

[22] Filed: Dec. 27, 1977

[51] Int. Cl.$^2$ .................................................. H01L 31/04
[52] U.S. Cl. .............................. 136/89 PC; 350/289; 353/3
[58] Field of Search ............... 126/270, 271; 350/289, 350/299; 250/203 R; 353/3; 136/89 PC

[56] References Cited

U.S. PATENT DOCUMENTS

| | | | |
|---|---|---|---|
| 260,657 | 7/1882 | Calver | 126/270 |
| 292,198 | 1/1884 | Barstow | 353/3 |
| 603,317 | 5/1898 | Calver | 126/270 |
| 1,111,239 | 9/1914 | Smelser | 126/270 |
| 1,632,254 | 6/1927 | Vinogradov | 353/3 |
| 1,976,428 | 10/1934 | Arthuys et al. | 353/3 |
| 2,913,583 | 11/1959 | Regnier et al. | 250/203 R |

*Primary Examiner*—John W. Shepperd
*Attorney, Agent, or Firm*—Sixbey, Friedman & Leedom

[57] ABSTRACT

A sun tracker including a dual axis support for following diurnal movement of the sun and a drive mechanism for providing motive force about a first axis of the support. Accurate movement of the tracker about a second support axis is caused by a system of cables and a cooperating cable engaging arcuate surface shaped to produce the necessary movement about the second axis to maintain the tracker in appropriate orientation with the sun throughout the day. Seasonal adjustment is effected by adjusting the cable lengths.

18 Claims, 6 Drawing Figures

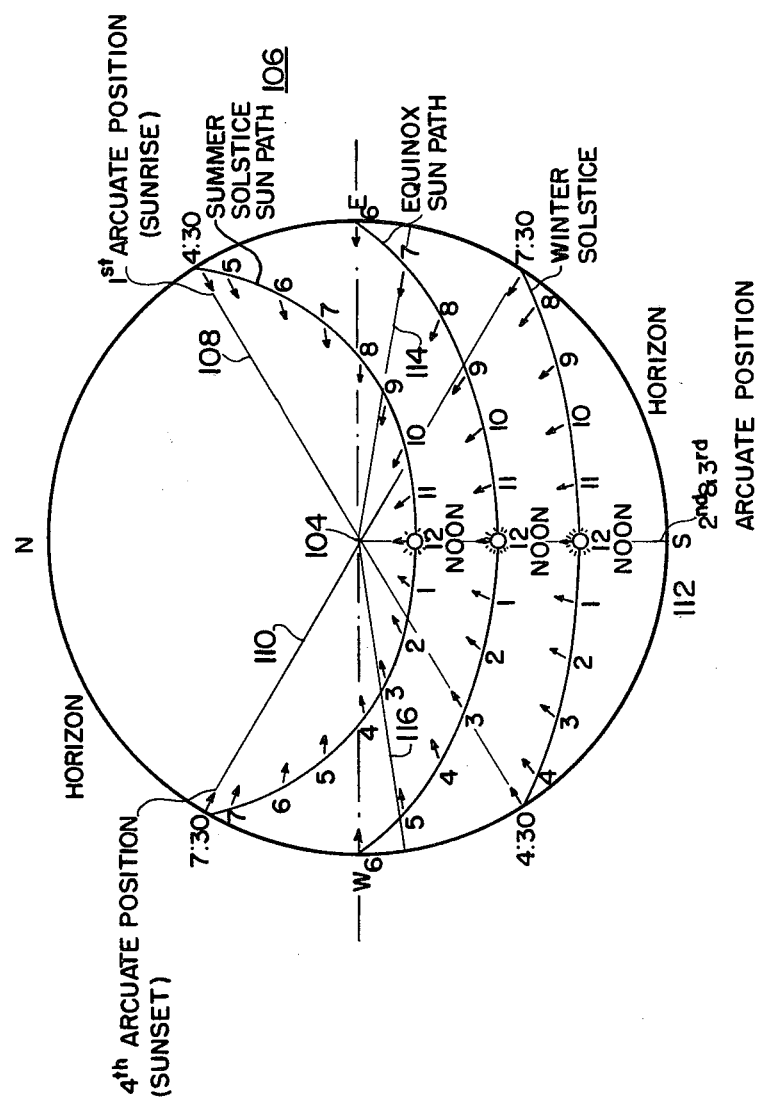

SUN TRACKER WITH DUAL AXIS SUPPORT FOR DIURNAL MOVEMENT AND SEASONAL ADJUSTMENT

BACKGROUND OF THE INVENTION

1. Field of the Invention

This invention relates generally to sun tracking apparatus including diurnal tracking with seasonal adjustment.

2. Discussion of the Prior Art

Despite the urgent need for a cost effective method of using solar energy to replace more conventional energy sources, progress toward this goal has been very slow. In order for solar energy to supply a significant proportion of the energy required by mankind, it is generally believed that it will be necessary to provide efficient means for converting solar energy directly into electrical energy, such as by use of solar cells, or into a more managable form of heat, such as by use of solar collectors for heating a heat transfer medium. While inexpensive stationary solar cells and collectors are useful in some applications, optimal utilization of solar energy appears to require some type of apparatus for tracking the movement of the sun preferably both diurnally (throughout the day light hours) and seasonally so that the solar cells or the collectors are always arranged perpendicularly to the sun line, defined as the line between a point on the earth and the center of the sun.

Numerous attempts have been made to produce a sun tracking system which is capable of maintaining the desired orientation of a panel of solar cells or collectors at all times throughout the day and year as discussed above but these efforts have yet to yield a sufficiently effective low cost sun tracker. For example, the patent to Toulmin, Jr. (U.S. Pat. No. 3,070,643) discloses a closed loop servo system for continuously pointing a solar cell directly toward the sun by sensing the sun's position and selectively driving the solar cell support about one or the other of a pair of axis. Devices of this type (termed heliostats) are well known but suffer from a number of drawbacks especially including high cost and complexity. For example, the Toulmin, Jr. patent discloses a complicated gearing system with a single drive motor and an electrically operated clutch to permit selective dual axis drive. Other systems such as illustrated in U.S. Pat. Nos. 3,998,206 and 3,996,917 employ separate drive motors for obtaining dual axis movement. While useful for the purposes disclosed these closed loop servo systems (that is, systems employing sun position sensors for controlling the timing and amount of tracking movement by the servo system) are costly to install and are subject to mechanical or electrical breakdown which adversely affects their reliability. Moreover, during periods of partial cloud cover, the ability of such systems to track the sun may be impaired; thus, requiring the system to include an open loop servo capability (that is an ability to track the positions of the sun without using sun position sensors) such as is disclosed in U.S. Pat. No. 4,031,385. Obviously the use of both an open loop and closed loop servo control in the same system adds significantly to the cost of initial installation and maintenance of a sun tracking apparatus.

Various types of open loop sun tracking systems have been disclosed such as illustrated in U.S. Pat. Nos. 787,145 and 4,011,854 in which mechanical or electrical timers are used to control the movement of the tracker without the aid of sun position sensors. Both of the trackers illustrated in these patents permit seasonal adjustment but provide only single axis rotation during each day. While single axis rotation permits acceptable tracking of the sun's position during certain times of the year and at certain points on the earth's surface, at other times and locations, single axis rotation during the day is not sufficiently accurate in terms of maintaining the desired orientation of the solar cells or collectors throughout the entire day.

Some open loop trackers are known (such as illustrated in U.S. Pat. No. 820,127) which provide daily dual axis tracking using a single motor drive. However, such systems have not generally been designed to reproduce the complicated changes in the celestial path which the sun follows diurnally and seasonally. For example, U.S. Pat. No. 820,127 discloses an open loop dual axis sun tracker wherein rotation about a horizontal axis and a vertical axis is effected by a single motor through a constant ratio drive train interconnecting the vertical and horizontal rotational supports. Obviously, a system of this type cannot accommodate seasonal changes without complicated modifications of the drive train.

SUMMARY OF THE INVENTION

It is a primary object of this invention to overcome the drawbacks of the prior art as discussed by providing an open loop sun tracking apparatus which is designed to permit accurate dual axis diurnal tracking combined with extremely simple seasonal adjustment.

A more particular object of this invention is to provide a sun tracking apparatus including a base and a rotatable frame for supporting solar cells or collectors which apparatus employs a single motor drive for mechanically displacing the frame about a first axis relative to the base and further employs an inextensible-flexible connecting member extending between the base and the frame for rotating the frame about a second axis relative to the base in dependence upon the amount of rotation of the frame about the first axis. The degree of rotation about the second axis relative to the first is controlled by the shape and position of a connecting member guide means including an arcuate surface about which the connecting member is caused to progressively wrap itself thereby effecting displacement of the frame about the second axis.

A more particular object of the invention is to provide a sun tracker including the above features wherein a second flexible, inextensible connecting member is provided for rotating the frame about the second axis in response to rotation of the frame about the first axis, the first connecting member being positioned relative to the connecting member guide means so as to cause rotation of the frame about the second axis whenever the frame is rotated between first and second arcuate positions spaced about the first axis. The second connecting member is positioned relative to the connecting member guide means to cause rotation of the frame about the second axis whenever the frame is rotated between third and fourth arcuate positions spaced about the first axis.

An even more specific object of this invention is to provide a sun tracking apparatus having the features noted above wherein the flexible, inextensible manner includes a pair of cables extending between the base and the frame and the connecting member guide means includes a cable engaging arcuate surface fixedly mounted to the base in a position spaced from the first axis about which the frame may be rotated. The arcuate surface has a radius of curvature and is spaced from the first axis such that rotation of the frame about the first axis causes a plane defined by the frame to follow the diurnal movement of the sun throughout rotation of the frame between the first and fourth arcuate positions.

Still another object of the invention is to provide a sun tracking apparatus wherein the cables are connected to a connecting block mounted for movement along a path any point of which is equal distant from the extremities of the cable engaging arcuate surface, whereby movement of the connecting block causes equal adjustments in the effective lengths of the respective first and second cables to thereby effect seasonal adjustment in the diurnal path through which the frame is caused to move.

Still other and more specific objects of the specific invention will appear from the following detailed description of the preferred embodiment.

SUMMARY OF THE DRAWINGS

FIG. 6 is a conventional sun path diagram depicting the path of the sun as projected onto a horizontal plane surrounding a point on the earth's surface at which a sun tracker designed in accordance with this invention may be placed.

DESCRIPTION OF THE PREFERRED EMBODIMENT

Figure 1:
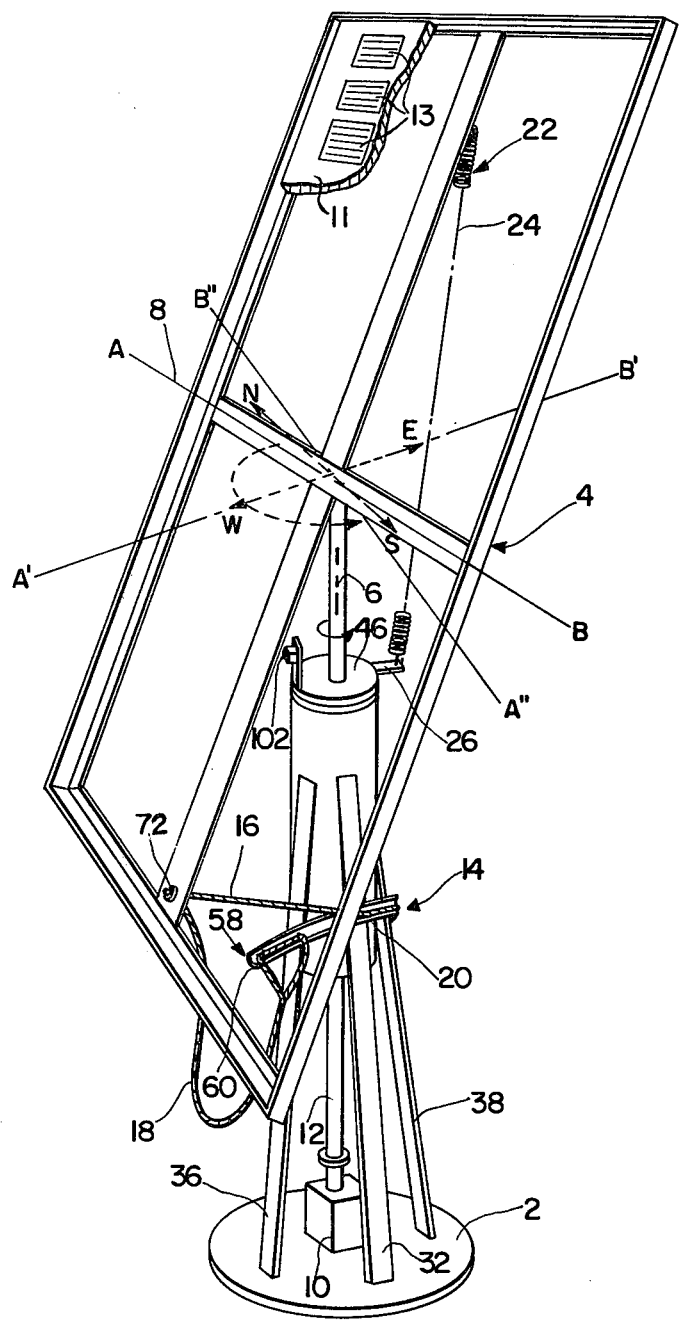
FIG. 1 is a perspective view of an open loop sun tracker designed in accordance with the subject invention.

With reference to FIG. 1, a sun tracker designed in accordance with the subject invention is illustrated including a base 2 to which is rotatably mounted a frame means 4 for rotation about a vertical (first) axis 6 and a horizontal (second) axis 8. Drive means 10 (discussed in more detail below) may be mounted on base 2 in order to provide rotational drive to the frame means 4. The drive means 10 is connected directly with a shaft 12 having a longitudinal axis coincident with the first axis 6 such that motive force transmitted to the frame means by shaft 12 will cause rotational movement of the frame means about the first axis 6.

The frame means 4 which may be formed from standard angle iron arranged in a generally square configuration is adapted to support solar cells or solar collectors in a plane which may be rotated about the first and second axes with respect to the base 2. One portion of a solar cell panel 11 containing solar cells 13, supported by frame means 4, is illustrated in FIG. 1. As frame means 4 is rotated by drive means 10 about the first axis 6, frame positioning means 14 are provided for rotating the frame means 4 about the second axis 8. The frame positioning means 14 includes first and second flexible, inextensible connecting members such as cables 16 and 18 the ends of which are connected with the frame means 4 and base 2, respectively, as will be discussed in more detail below. As the frame means 4 is rotated about first axis 6, one of the cables 16 or 18 is caused to engage and wrap about a connecting member guide means 20 which is shaped to produce the desired degree of rotation about axis 8 relative to the rotation about axis 6 which is necessary in order to maintain the plane defined by frame means 4 perpendicular to the sun line (that is the line extending between the point on the earth's surface at which the sun tracker is mounted and the center of the sun during daylight hours). Frame means 4 is continuously biased in one direction about the second axis 8 by a bias means 22 which may include a tension spring 24 connected at one end to the frame means 4 and at the other end to a spring support 26 mounted to rotate with shaft 12 about the first axis 6.

Figure 2:
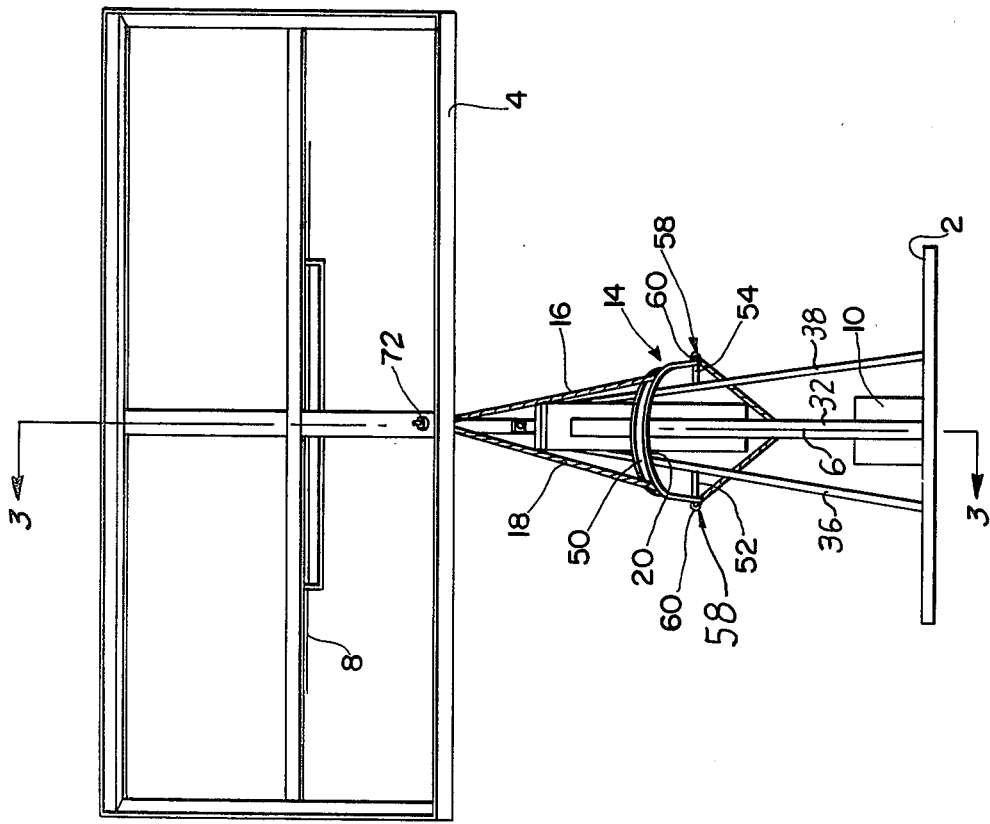
FIG. 2 is a front elevational view of the diurnal sun tracker illustrated in FIG. 1 wherein the sun tracker frame on which solar cells or collectors may be mounted is illustrated in the mid-day position.

To understand the subject sun tracker in greater detail, reference is made to FIG. 2 wherein the sun tracker of FIG. 1 is illustrated in a configuration in which it would appear at mid-day. In this position, cables 16 and 18 are both in a taut position holding the frame means 4 against the bias of spring 24. Further rotation of the frame means 4 about the first axis 6 will cause cable 16 to be wrapped about the connecting member guide means 20 thereby causing the frame means to rotate about axis 8 in an amount controlled by the rotational displacement of the frame means about first axis 6 and dependent upon the shape and position of the connecting member guide means 20. The manner by which rotational movement of frame means 4 is initiated and terminated will be discussed in greater detail hereinbelow with reference to FIG. 5.

Figure 3:
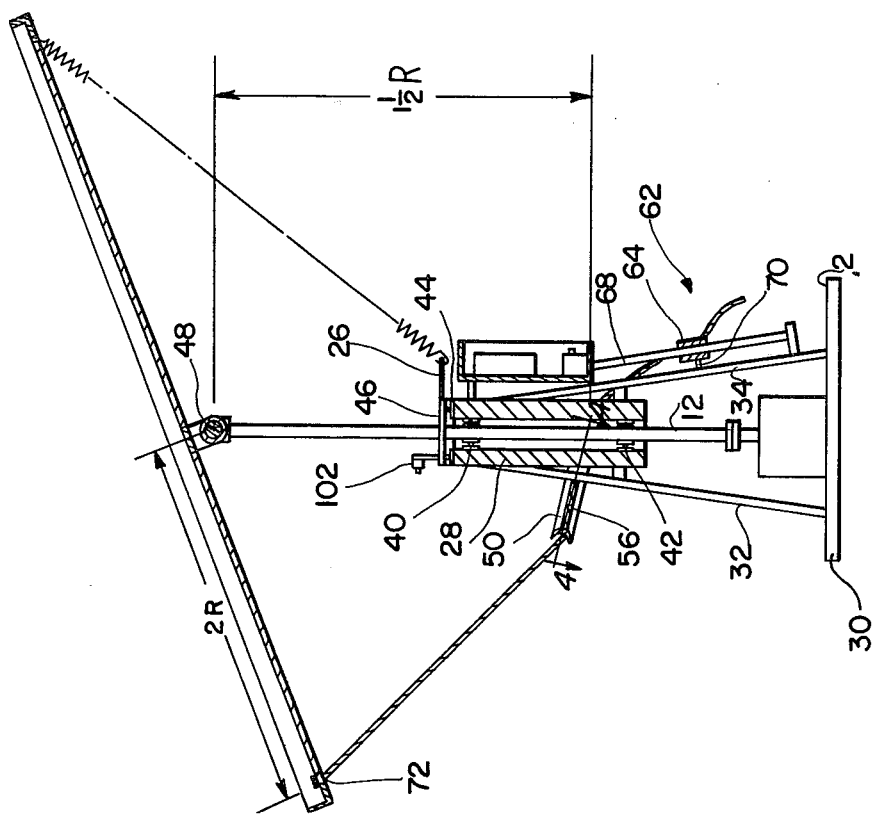
FIG. 3 is a partial cross-sectional view of the sun tracker illustrated in FIG. 2 taken along lines 3—3.

FIG. 3 discloses the base 2 in greater detail wherein shaft 12 is shown as being rotatably supported within a tubular support 28 connected to a base plate 30 by means of front and back struts 32 and 34, respectively, as well as side struts 36 and 38 (illustrated in FIG. 1). Shaft 12 is supported by radial bearings 40 and 42 within tubular support 28 and by thrust bearings 44 placed between the upper end of tubular support 28 and a radial flange 46 integral with shaft 12. The upper end of shaft 12 is provided with a rotatable connection designed to provide a pivot axis for the frame means 4 to thereby define the second axis 8 referred to above. It can thus be seen that in the preferred embodiment, the first axis 6 is arranged in a vertical direction whereas the second axis 8 of rotation of frame means 4 is arranged in a horizontal direction.

Figure 4:
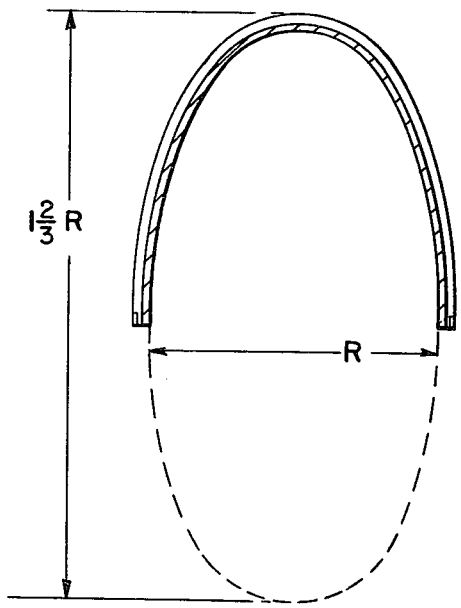
FIG. 4 is a partial cross-sectional view illustrating the frame positioning means of the subject sun tracker taken long lines 4—4 of FIG. 3.

As illustrated in FIGS. 1–3 and in even greater detail in FIG. 4, the connecting member guide means 20 is formed by a cable engaging arcuate surface 50 having a generally overall U-shape with the extremities being connected to side struts 36 and 38 by means of spacers 52 and 54 (FIG. 2) and by spacer 56 (FIG. 3) connected with front strut 32. As can be seen most clearly in FIG. 3, the cable engaging arcuate surface 50, is inclined upwardly from its extremities so as to accommodate variation in the vertical height of the cables 18 and 16 as they are wrapped alternatively in one direction or the other about the cable engaging arcuate surface. In cross section, the arcuate surface 50 has a "V" shape (FIG. 3) to guide cables 16 and 18 into the bottom of the "V" shape as one or the other of the cables is wrapped therearound.

At each end of the cable engaging arcuate surface 50, cable retaining means 58 (FIGS. 1 and 2) are placed for holding the first and second cables thereat while permitting the cables to move longitudinally with respect to the extremities of the arcuate surface 50. Such cable retaining means 58 may consist of loops 60 having an internal opening through which the respective cables may pass. Cable length adjusting means 62 (FIG. 3) is provided for permitting simultaneous adjustment in the effective length of the first and second cables. This cable length adjusting means includes a movable connector 64 adapted to move along a path equal distant from the extremities of the cable engaging arcuate surface 50. The movable connector 64 is internally threaded for engagement with a rotatable screw shaft 68 mounted generally parallel with back strut 34. The movable connector 64 is restrained from rotational movement by means of a U-shaped bracket 70 the extremities of which engage each side of back strut 34 to thereby restrain rotational movement of the movable connector 64 whenever the screw shaft 68 is rotated. As can thus be appreciated rotation of screw shaft 68 will cause connector 64 to travel longitudinally along the shaft 68 and simultaneously cause adjustment in the length of the cables extending between the extremities of cable engaging arcuate surface 50 and the common connection point 72 of the first and second cables with the frame means.

It should now be obvious that the shape of the cable engaging surface 50 is in fact the critical element of the subject invention insofar as this surface causes the frame means 4 to rotate about axis 8 in an amount related to rotation of the frame means 4 about axis 6. By providing surface 50 with an appropriate shape, the plane defined by the frame means 4 will be maintained perpendicular to the direction of the sun line at all times throughout the daylight hours as shaft 12 is rotated by drive means 10 in an amount sufficient to position the frame means in the desired perpendicular direction. In other words, so long as the drive means 10 is caused to properly position the frame means 4 about first axis 6, the cable engaging arcuate surface 50 must be shaped so as to cause appropriate rotation of the frame means about the second axis 8. It has been determined that when the common point of attachment of cables 16 and 18 are spaced from axis 8 by a distance of 2R and the extremeties of cable engaging arcuate surface 50 are spaced vertically below axis 8 by a distance of 1½R, the configuration of the cable engaging arcuate surface 50 should take the form of a semi-parabolic surface as illustrated in FIG. 4 having a major diameter of 1⅜R and a minor diameter of R with R being an arbitrary length dependent upon the overall dimension of the sun tracker. In one operative embodiment of the invention wherein the design of the arcuate surface 50 was imperically determined, R equaled 12 inches.

Figure 5:
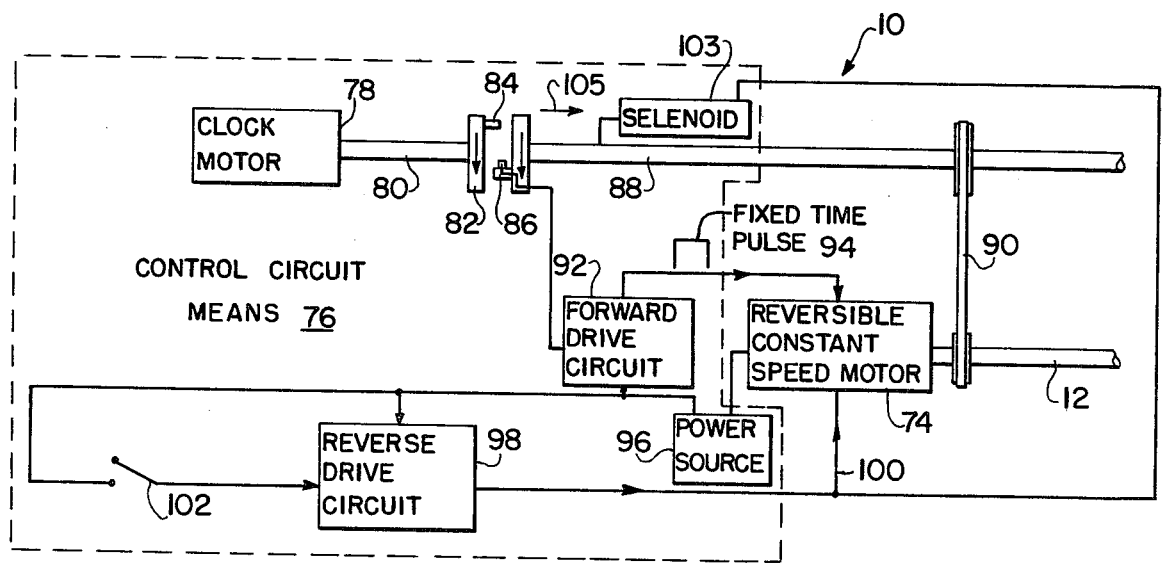
FIG. 5 is a schematic diagram of the drive means for the sun tracker of this invention.

Turning now to the control system used to drive the disclosed tracking apparatus, reference is made to FIG. 5 wherein a schematic illustration of the drive means 10 is shown. Particular drive means includes reversible constant speed motor 74 the output of which is connected to shaft 12 through a speed reduction mechanism (not shown). This motor is in turn energized by a control circuit means 76 shown within the dashed lines in FIG. 5 wherein a timing clock motor 78 is provided for driving an output shaft 80 through a 360° turn during each 24 hour period. Shaft 80 includes a disc 82 integrally connected with shaft 80 and a switch actuating projection 84 adapted to periodically engage forward drive switch 86 mounted for rotation with a shaft 88. Shaft 12 is connected through a unity ratio connection 90 to shaft 88 which, thus, turns one revolution for each revolution of shaft 12. Alternatively, of course, switch 86 could be mounted directly on shaft 12.

Each time that switch 86 is actuated, a signal is sent to the forward drive circuit 92 designed to produce a fixed time pulse 94 for energizing reversible constant speed motor 74 for a fixed time period. Energization of motor 74 causes shaft 12 to rotate in a first direction which is connected to cause the sun tracker frame means 4 to move in the direction of the sun's movement during the daylight hours. As shaft 12 moves, shaft 88 also moves to rotationally displace switch 86 ahead of the switch actuating projection 84. By this arrangement shaft 12 is caused to move in steps with the continuous movement of output shaft 80 of the timing clock motor 78. Energy for driving the reversible speed motor 74 and the clock motor 78 is derived from a power source 96. Of course, a variety of other alternative control circuits may be provided to cause either intermittent or continuous rotation of shaft 12, so long as the effect is to provide a rotational speed to shaft 12 equal to one revolution per 24 hours.

It is of course, necessary, to provide for a reversal in rotation of shaft 12 at sunset so that the frame may be returned to a position at which the solar cells or collectors may be positioned to receive direct sunlight at sunrise the next morning. This function is provided by a reverse drive circuit 98, the output of which is connected to the reversible constant speed motor 74 through electrical lead 100 so as to cause motor 74 to operate in the reverse direction and at a higher speed so as to return shaft 12 toward the desired sunrise position. Initiation of the reverse drive circuit is caused by a limit switch 102 illustrated schematically in FIG. 5. This switch is mounted on radial flange 46 (FIG. 1 and FIG. 3), so as to rotate with shaft 12 and is positioned to be engaged by a portion of the frame means when the frame means has reached the full limit of desired displacement around first axis 6 in either direction. Thus, reverse drive circuit 98 is designed upon a first closing of the limit switch 102 to cause the reversible constant speed motor to be driven in reverse direction opposite to the direction necessary for causing the frame means 4 to follow the sun throughout daylight hours. Upon reaching the full limit of desired displacement in the reverse direction about first axis 6, limit switch 102 is again actuated by the same portion of the frame means 4 so as to deactuate the reverse drive circuit 98. A variety of circuit designs are possible for performing the function described above for reverse circuit 98. In essence, the circuit must be capable merely of providing an output signal alternately upon successive actuations of limit switch 102.

During reverse movement of shaft 12, it is of course necessary that switch 86 be moved out of the path of switch actuating projection 84. This may be accomplished by actuating a solenoid 103 connected to move shaft 88 along its longitudinal axis as illustrated by arrow 105 during the reverse movement of shaft 12. Upon shaft 12 attaining the full limit of its reverse rotational position, switch 86 is properly positioned so as to be energized the following morning by switch projection 84, corresponding to the time at which the sun rises.

Reference is now made to FIG. 6 wherein a conventional sun path diagram is shown depicting the path of the sun when projected onto a horizontal plane surrounding a point on the earth's surface at which a sun tracker of the subject design may be placed as indicated by point 104. As is apparent in FIG. 6, the greatest arcuate movement necessary for the sun tracker to follow the sun between sunrise and sunset occurs along the summer solstice sun path 106. Frame means 4 must be perpendicularly oriented with respect to line 108 in order for the plane defined by the frame means to be perpendicular to direct sun rays at sunrise. At sunset, frame means 4 must have been rotated such that the plane defined by frame means 4 is arranged perpendicularly to line 110.

Operation of the subject apparatus may be understood by again referring to FIGS. 1–3 wherein it can be seen that cable length adjusting means 62 may be operated so as to change the effective portions of cables 16 and 18 to modify the tracking path of frame means 4. Although the tracker may be adjusted at any time, it is easiest to understand the adjustment operation by referring to FIG. 3 wherein frame means is illustrated in the mid-day position with the second axis aligned in a generally East-West direction. Cables 16 and 18 may then be adjusted so as to cause the plane defined by frame means 4 to point directly at the sun. It can thus be seen that by providing an appropriate shape to cable engaging surface 50 the desired degree of rotation of the frame means 4 about axis 8 may be obtained so as to cause the plane defined by frame means 4 to be arranged perpendicularly to direct sun rays throughout the day. By properly positioning limit switch 102 so as to be engaged by the frame means at both sunrise and sunset, the drive means 10 including the control main circuit 76 will be automatically adjusted upon appropriate shortening or lengthening of the cables so as to cause the plane of the frame means to be pointing in the appropriate direction at both sunrise and sunset while at the same time automatically causing the frame means to properly track the sun's movement. As the frame means moves from the first arcuate position around first axis 6 as illustrated in FIG. 6, to the mid-day position, movement of the frame means is controlled by cable 18 between the first arcuate position (line 108) and the second arcuate position (line 112). Further rotation of the frame means about first axis 6 results in cable 16 controlling the movement of the frame means about second axis 8 between a third arcuate position coincident with the second arcuate position (line 112) to the fourth arcuate position (line 110). Upon changes in the cable lengths, the first and fourth arcuate positions may be adjusted so as to place the plane defined by the frame means 4 in an appropriate position relative to changes in the seasonal path of the sun. For example lines 114 and 116 are representative of the necessary first and fourth arcuate positions during fall and spring when the path of the sun follows an intermediate course between the summer solstice and winter solstice.

As can now be appreciated, a sun tracking apparatus has been disclosed which permits two axis diurnal sun tracking wherein motive power is provided to cause rotation about a first axis with rotation about the second axis being caused by one of a pair of flexible inextensible connecting members. Very simple seasonal adjustment is possible by merely adjusting the length of the flexible, inextensible connecting members. This design permits very accurate open loop sun tracking and, thus, overcomes the deficiencies of the prior art wherein accurate sun tracking was possible only with the provision of complicated closed-loop servo systems or extremely complex mechanical mounting arrangements.

I claim:

1. A seasonably adjustable diurnal sun tracking apparatus, comprising
   (a) a base;
   (b) frame means defining a plane;
   (c) mounting means for mounting said frame means on said base for rotational movement about a first axis which is fixed relative to said base and about a second axis which is different from said first axis to permit the plane defined by said frame means to be positioned perpendicularly to the direction of direct sun light throughout each day of the year;
   (d) drive means connected with said support means for providing motive force to rotate said frame means about said first axis of rotation;
   (e) frame positioning means for rotating said frame means about said second axis of rotation in response to rotation of said frame means about said first axis, said frame positioning means including
      (1) at least one flexible, inextensible connecting member connected between said base and said frame means, and
      (2) connecting member guide means fixedly connected to said base for engaging a variable portion of said flexible connecting member when said frame means is rotated between first and second arcuate positions spaced about said first axis, whereby the effective length of said flexible connecting member extending between the guide means and said frame means is varied to cause said frame means to rotate about said second axis in an amount appropriate to maintain said plane perpendicular to the direction of direct sunlight.

2. A sun tracking apparatus as defined in claim 1, wherein said first axis is oriented vertically and said second axis is oriented horizontally and wherein said mounting means includes a shaft mounted on said base for rotation about said first axis and said frame means is mounted on the upper end of said shaft for rotation about said second axis.

3. A sun tracking apparatus as defined in claim 1, wherein said frame positioning means further includes a second flexible, inextensible connecting member connected at one end to said base and to said frame means at the other end, said connecting member guide means being positioned and shaped for engaging a variable portion of said second flexible connecting member as said frame means is rotated between third and fourth arcuate positions spaced about said first axis.

4. A diurnal sun tracking apparatus as defined in claim 3, wherein said first and second connecting members are cables and said connecting number guide means includes a cable engaging arcuate surface fixedly mounted to said base in a position spaced from said first axis, said arcuate surface having a radius of curvature and a position spaced from said first axis such that rotation of said frame means about said first axis to follow diurnal movement of the sun will cause one of said cables to engage said arcuate surface over a sufficient portion to cause rotation of said frame means about said second axis in an amount necessary to cause the plane defined by said frame means to be maintained perpendicular to the direction of direct sun rays.

5. A sun tracking apparatus as defined in claim 4, wherein said frame positioning means includes bias means for continuously biasing said frame means in one direction around said second axis, said frame means being restrained from rotational movement about said second axis by said first and second cables whenever said frame means is stationary with respect to said first axis.

6. A sun tracking apparatus as defined in claim 5, wherein said first arcuate position corresponds to the arcuate position of said frame means necessary for positioning said plane defined by said frame means perpendicularly to direct sun rays at sun rise and said fourth arcute position corresponds to the arcuate position of said frame means necessary for positioning said plane perpendicularly to direct sun rays at sun set, said second and third arcuate positions being the same position, said first and second cables being connected to a common point on said frame means and having equal lengths extending between said common point and the extremities of said cable engaging arcuate surface, respectively.

7. A sun tracking apparatus as defined in claim 6, wherein said effective lengths of said cables when said frame means is in said second arcuate position may be adjusted dependent on the season of the year to cause said plane defined by said frame means to be precisely positioned perpendicular to the direction of direct sun rays regardless of the season of the year, said cable engaging arcuate surface being shaped to cause corresponding adjustment in the position of said plane throughout the diurnal movement of the sun in order to maintain the precise perpendicular position of said plane throughout the day of the direct rays of the sun regardless of the season of the year.

8. A sun tracking apparatus as defined in claim 7, wherein said first axis is generally vertical, said second axis is generally horizontal, said common point is spaced approximately 2R in a perpendicular direction from said second axis of said frame means, said cable engaging arcuate surface extending 180° around said first axis with the extremities being spaced approximately ½R, respectively, from said first axis on a generally horizontal line passing through said first axis, said cable engaging arcuate surface having a midpoint spaced approximately 5/6R from said first axis measured along an inclined line connecting said midpoint with the intersection of said horizontal line and said first axis, said inclined line being inclined upwardly by an angle of approximate 15° in a direction away from said horizontal line.

9. A sun tracking apparatus as defined in claim 8, wherein R equals approximately 12 inches.

10. A sun tracking apparatus as defined in claim 8, wherein said cable engaging arcuate surface generally defines one half of a parabolic curve having a major diameter of 1⅔R and a minor diameter of R.

11. A sun tracking apparatus as defined in claim 10, further including cable length adjusting means for permitting simultaneous adjustment in the effective length of said cables, said cable length adjusting means including a movable connector adapted to move along a path equal distant from said extremities of said cable engaging arcuate surface, and cable retaining means at said extremities for holding said cables at said extremities while permitting the cables to move longitudinally with respect to said extremities when said movable connector is moved.

12. A sun tracking apparatus as defined in claim 11, wherein said drive means includes electro motive power means for moving said frame means when electrically energized and electrical control means for energizing said electro motive power means to cause said frame means to move equal arcuate distances during predetermined equal time intervals.

13. A sun tracking apparatus, as defined in claim 12, wherein said electrical control means includes a limit switch means mounted for rotation with said frame means about said first axis for indicating when said frame means has been rotated into said first or said fourth arcuate positions.

14. A sun tracking apparatus as defined in claim 13, wherein said control means includes a reverse drive circuit means actuated when said frame means is rotated to said fourth arcuate position for driving said electro motive power means in reverse to rotate said frame means from said fourth arcuate position back to said first arcuate position at a rotational speed substantially greater than the average rotational speed of said frame means when being displaced from said first position toward said second position.

15. A diurnal sun tracking apparatus as defined in claim 11, wherein said cable length adjusting means includes a rotatable screw threaded shaft having a longitudinal shaft arranged along said equal distant path and said movable connector including a block threadedly received on said screw threaded shaft, said block being restrained from rotational movement and having one end of each cable secured thereto for movement with said block.

16. A sun tracking apparatus as defined in claim 12, wherein said electrical control means causes said frame means to be rotated through 4° every 15 minutes by energizing said electro motive means for 10 seconds.

17. A diurnal sun tracking apparatus as defined in claim 4, wherein said cable engaging arcuate surfaces have a generally "V" shaped cross-section to cause said cables to be guided into the bottom of said "V" shaped cross-section when said cables come into contact with said cable engaging arcuate surfaces.

18. A sun tracking apparatus as defined in claim 1, further including a solar cell panel mounted on said frame means, said solar cell panel being disposed within said plane.

* * * * *